(12) United States Patent
Shields et al.

(10) Patent No.: US 12,425,741 B2
(45) Date of Patent: Sep. 23, 2025

(54) SYSTEMS AND METHODS FOR MOTION DETECTION, QUANTIFICATION, AND/OR MEASUREMENT WITH EXPOSURE CORRECTION IN VIDEO-BASED TIME-SERIES SIGNALS

(71) Applicant: Mechanical Solutions Inc., Whippany, NJ (US)

(72) Inventors: Timothy Shields, Beverly, MA (US); William D. Marscher, Morristown, NJ (US); Sergey Frolov, New Providence, NJ (US)

(73) Assignee: Mechanical Solutions Inc., Whippany, NJ (US)

( * ) Notice: Subject to any disclaimer, the term of this patent is extended or adjusted under 35 U.S.C. 154(b) by 468 days.

(21) Appl. No.: 17/951,961

(22) Filed: Sep. 23, 2022

(65) Prior Publication Data

US 2023/0103947 A1    Apr. 6, 2023

Related U.S. Application Data

(60) Provisional application No. 63/248,020, filed on Sep. 24, 2021.

(51) Int. Cl.
*G06T 7/80* (2017.01)
*G06T 5/10* (2006.01)
(Continued)

(52) U.S. Cl.
CPC ............... *H04N 23/73* (2023.01); *G06T 5/10* (2013.01); *G06T 5/73* (2024.01); *G06T 7/20* (2013.01);
(Continued)

(58) Field of Classification Search
CPC ........ H04N 23/73; H04N 5/91; H04N 17/002; H04N 23/6811; H04N 23/76; G06T 5/10;
(Continued)

(56) References Cited

U.S. PATENT DOCUMENTS

| | | | |
|---|---|---|---|
| 6,515,734 B1 * | 2/2003 | Yamada | H04N 9/3147 |
| | | | 355/71 |
| 7,196,644 B1 | 3/2007 | Anderson et al. | |

(Continued)

FOREIGN PATENT DOCUMENTS

| | | |
|---|---|---|
| WO | WO2014024121 | 2/2014 |
| WO | WO2019222833 | 11/2019 |

OTHER PUBLICATIONS

Strickling. W.; Shadow bands during a total solar eclipse; last updated Sep. 17, 2017; http://www.strickling.net/shadowbands.htm; 5 Pages.

(Continued)

*Primary Examiner* — Tom Y Lu
(74) *Attorney, Agent, or Firm* — Schmeiser, Olsen & Watts, LLP

(57) ABSTRACT

A system and method for detecting, quantifying, and/or measuring motion of an object and correcting for exposure includes providing a processor and at least one video sensor; determining video recording parameters of the at least one video sensor; recording, by the at least one video sensor, video of the object; extracting a data set from the video wherein the data set describes the motion of the object; calculating a frequency transform of the data set for at least one frequency; and performing exposure correction at the at least one frequency based on the recording parameters.

19 Claims, 7 Drawing Sheets

(51) Int. Cl.
*G06T 5/73* (2024.01)
*G06T 7/20* (2017.01)
*H04N 5/91* (2006.01)
*H04N 17/00* (2006.01)
*H04N 23/73* (2023.01)

(52) U.S. Cl.
CPC ............... *G06T 7/80* (2017.01); *H04N 5/91* (2013.01); *H04N 17/002* (2013.01); *G06T 2207/10016* (2013.01); *G06T 2207/20056* (2013.01)

(58) Field of Classification Search
CPC .... G06T 5/73; G06T 7/20; G06T 7/80; G06T 2207/10016; G06T 2207/2005; G06T 2207/20201
See application file for complete search history.

(56) References Cited

U.S. PATENT DOCUMENTS

| | | | |
|---|---|---|---|
| 7,843,510 | B1 | 11/2010 | Ayer et al. |
| 8,786,680 | B2 | 7/2014 | Shiratori et al. |
| 10,593,167 | B2 | 3/2020 | Gervais et al. |
| 2008/0225125 | A1* | 9/2008 | Silverstein ............. H04N 23/73 348/E5.037 |
| 2009/0139334 | A1 | 6/2009 | Mustonen |
| 2011/0080211 | A1 | 4/2011 | Yang et al. |
| 2013/0002968 | A1 | 1/2013 | Bridge et al. |
| 2013/0122845 | A1 | 5/2013 | Loewenstein |
| 2014/0375848 | A1* | 12/2014 | Yamamoto ........... H04N 23/741 348/241 |
| 2015/0324636 | A1 | 11/2015 | Bentley et al. |
| 2016/0217587 | A1 | 7/2016 | Hay |
| 2016/0273957 | A1 | 9/2016 | Bendele et al. |
| 2017/0169575 | A1 | 6/2017 | Perez Acal et al. |
| 2020/0175660 | A1* | 6/2020 | Iijima ...................... G06T 5/50 |

OTHER PUBLICATIONS

Chen, J. et al.; Video Camera-Based Vibration Measurement for Civil Infrastructure Applications; Journal of Infrastructure Systems; 23(3); Dec. 8, 2016; 11 Pages.

Dunton, T.; "An Introduction to Time Waveform Analysis"; https://reliabilityweb.com/articles/entry/an_introduction_to_time_waveform_analysis; 2020.

Braun, S.; The Synchronous (time domain) average revisited; Mechanical Systems and Signal Processing; May 2011; pp. 1087-1102; vol. 25.

Gao, Z. et al.; Averaging video sequences to improve action recognition; 2016 9th International Congress on Image and Signal Processing; BioMedical Engineering and Informatics (CISP-BMEI); Datong; 2016, pp. 89-93.

Mehrubeoglu, M. et al.; Object tracking using multiple camera video streams; SPIE Proceedings; Apr. 2010; 10 pages; vol. 7724; DOI: 10.1117/12.854091.

Petitjean, F. et al.; Summarizing a set of time series by averaging: From Steiner sequence to compact multiple alignment; Theoretical Computer Science; 2012; pp. 76-91; vol. 414, Issue 1.

Diego, F.; Probabilistic Alignment of Video Sequences recorded by Moving Cameras; Universitat Autonoma de Barcelona; Jul. 22, 2011; 154 Pages.

Lu, C. et al.; A Robust Technique for Motion-Based Video Sequences Temporal Alignment; IEEE Transactions on Multimedia; Oct. 16, 2012; pp. 70-82; vol. 15, Issue 1; DOI: 10.1109/TMM.2012.2225036.

Caspi, Y. et al.; A step towards sequence-to-sequence alignment; Proceedings IEEE Conference on Computer Vision and Pattern Recognition. CVPR 2000 (Cat. No.PR00662); Hilton Head Island, SC; Jun. 15, 2000; DOI: 10.1109/CVPR.2000.854940.

* cited by examiner

SYSTEMS AND METHODS FOR MOTION DETECTION, QUANTIFICATION, AND/OR MEASUREMENT WITH EXPOSURE CORRECTION IN VIDEO-BASED TIME-SERIES SIGNALS

CROSS REFERENCE TO RELATED APPLICATIONS

This application claims priority to and the benefit of U.S. Provisional Patent Application No. 63/248,020 filed on Sep. 24, 2021, the entire contents of which are incorporated by reference.

TECHNICAL FIELD

The present invention relates to methods for detection, quantification, and/or measurement of motion while correcting for errors introduced by imaging exposure (amount of time used to collect light by a sensor). Such error correction may be especially useful as the duration of motion approaches the imaging exposure duration. Related systems and computer program products are also disclosed.

BACKGROUND

Detection of sub-pixel motion using high frame rate digital video processing is a relatively new field. Conventional methods do not use exposure corrections and thus can suffer from significant measurement errors, particularly as motions occur over a duration approaching the imaging exposure duration. Conventionally, this issue may be mitigated by reducing the exposure duration such that motion may be observed with minimal degradation. However, this option is not practical in many applications, for example, where exposure reduction results in a severe image and video quality degradation. Instead, maximum exposure durations (or near maximum) are used and correction of exposure issues created by these exposure durations may result in more accurate motion detection, quantification, and/or measurement. Thus, improved systems and methods for motion detection, quantification, and/or measurement with exposure correction in video-based signal analysis would be well received in the art.

SUMMARY

An embodiment of the present invention relates to a method for detecting, quantifying, and/or measuring motion of an object and correcting for exposure. A processor and at least one video sensor may be provided. Video recording parameters of the at least one video sensor may be determined. The at least one video sensor may record video of the object. The processor may extract a data set from the video wherein the data set describes the motion of the object, calculate a frequency transform of the data set for at least one frequency, and perform exposure correction at the at least one frequency based on the recording parameters.

A further embodiment of the present invention relates to a method including steps of providing a video and recording parameters of the video, extracting a data set from the video, wherein the data set includes a time series signal; calculating a frequency transform of the time series signal for at least one frequency; and performing exposure correction at the at least one frequency using the recording parameters.

A further embodiment of the present invention relates to a computer program product, comprising a computer readable hardware storage device storing a computer readable program code, the computer readable program code comprising an algorithm that when executed by a computer processor of a computing system implements a method for detecting, quantifying, and/or measuring motion with respect to an object and correcting for exposure. The computer process may extract a data set from a video, wherein the data set includes a time series signal; calculate a frequency transform of the time series signal for at least one frequency; and perform exposure correction at the at least one frequency using recording parameters of the video.

DETAILED DESCRIPTION

Figure 1:
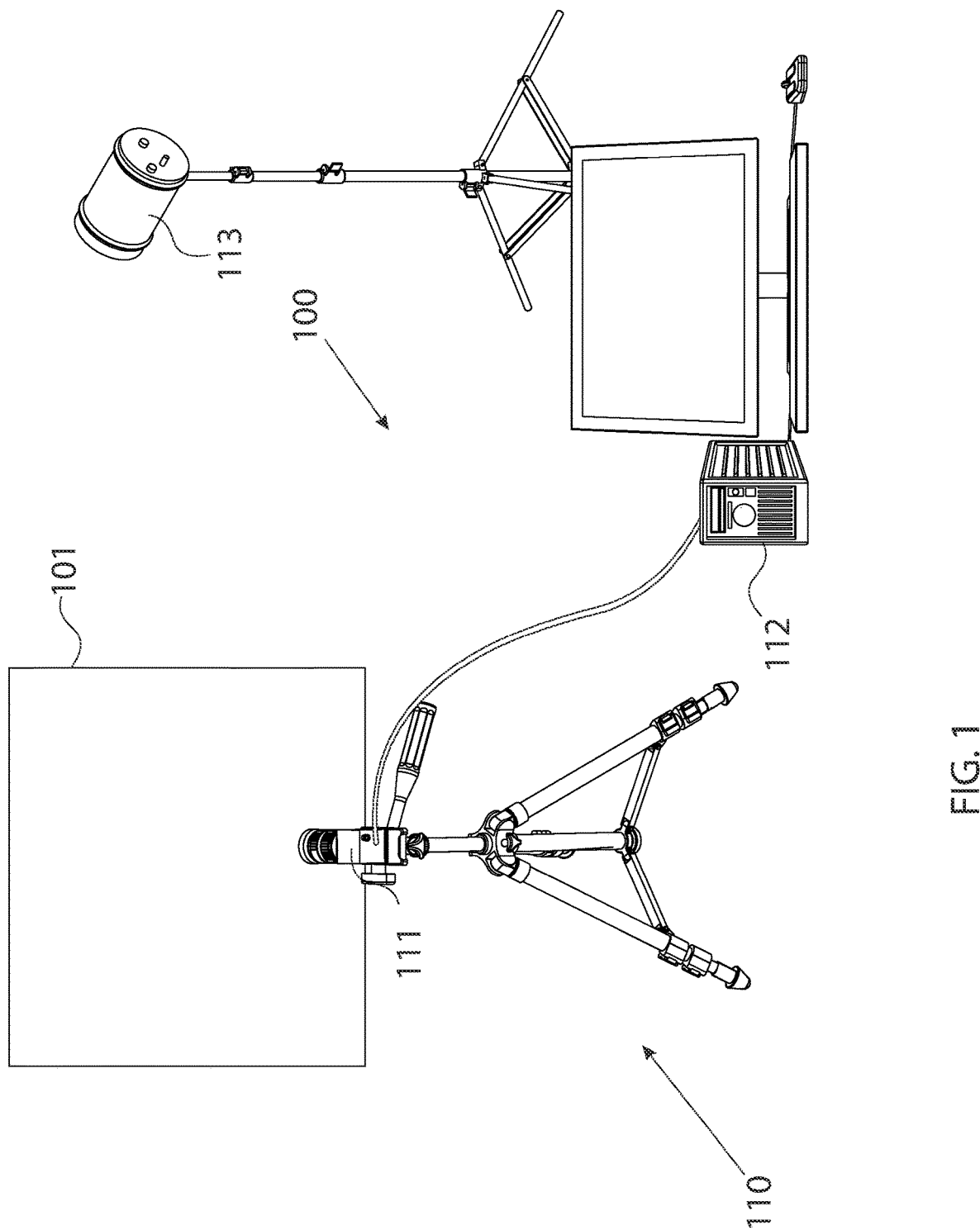
FIG. 1 depicts a schematic view of a motion detection, quantification, and/or measurement system with exposure correction in accordance with embodiments of the present invention.

Embodiments of the invention address the intersection of two broad domains: signal processing and machine vision. These are typically different technologies that have little in common and the methods and apparatus used in one area are often not useful or even applicable for use in the other. Embodiments of the invention address an example of a methodology used in signal processing, e.g., a Fourier transform, a fast Fourier transform (FFT), or other frequency identification methods such as wavelet processing methods, typically used to analyze a time-series signal, but applied to process a video recording. Because video recording apparatus operates differently from a typical signal sampling apparatus, this application often results in unexpected side-effects and incorrect measurements when taking data from the video signal. Embodiments of the invention provide methods of correcting these side-effects and thus achieve accurate measurements. For example, embodiments of the invention may achieve at least the same level of accuracy as would be achieved using more conventional signal sampling apparatus.

Embodiments of the invention may include a system for capturing, recording, and analyzing video and for detecting, quantification, and/or measurement motion and correcting for exposure. Such a system may be referred to broadly as a motion detection system with exposure correction; it will be understood that the term detection as used herein may also include quantification and/or measurement and the motion detection system may also be used for motion quantification and motion measurement. For example, referring to FIG. 1, a motion detection system with exposure correction 100 configured to implement embodiments of the present invention is shown. The motion detection system with exposure correction 100 may perform a motion detection and exposure correction method as discussed in more detail below. The motion detection system with exposure correction 100 includes a sensor system 110. The sensor system 110 comprises at least one sensor device 111. The sensor system 110 may comprise a video recording apparatus, for example, a camera system in which the at least one sensor 111 comprises a camera device. For example, the sensor system 110 may be capable of capturing video over a time interval. The sensor system 110 may also include a light source such as light source 113.

Referring still to FIG. 1, the sensor system 110 may comprise, or may be in communication with, a processor 112, for example, a processor of a computing system. The processor 112 may control the at least one sensor device 111. The processor 112 may also be configured to process and/or analyze information from the at least one sensor device 111, for example, video captured by the at least one sensor.

In embodiments, the sensor system 110 and/or the at least one sensor device 111 may be intended to capture video of or video with respect to an object 101 or an event of the object 101. In embodiments, the object 101 may be, for example, a rotating machine or a component of the rotating machine. The object 101 may be any type of object for which detection, quantification, and/or measurement is desired. For example, video of a motion of the object 101 may be recorded or captured. In embodiments, the event of the object 101 may be, for example, a rotation of the object 101, a motion of the object 101, a vibration of the object 101, and the like. In some embodiments, the event of the object 101 may be an expected or known motion. In other embodiments, the event may be an impulse on the object 101 or the timing of some other action taken by, or taken with respect to, the object 101.

Multiple data sets of sensor information may be collected. For example, a plurality of data sets of sensor information, such as a plurality of image frames, all or a portion of pixels of multiple image frames, selected periods of time, image pixels, sections of video files, entire video files, data relating to such images, data related to such pixels, data related to such frames, and the like may be captured. Still further, the data set may be a time series digital signal. For clarity, the terms data set and plurality of data sets may include any arrangement, collection, set, series, group, compilation, etc. of data from the sensor system 110 and/or the at least one sensor device 111. In some embodiments, the data set may describe the motion of the object in a plane perpendicular to a line-of-sight of the video sensor. For example, if the line-of-sight is in the south-north direction, the video sensor may be sensitive to motion and displacements in the vertical and horizontal east-west directions.

Further, while the multiple data sets may be acquired from a single source, such as the at least one sensor device 111; in some embodiments a plurality of individual data sets from each of multiple sources, such as multiple sensor devices or a combination of sensor devices may also be used.

The at least one sensor device 111, recorded video, and/or the data sets may have set and/or adjustable video recording parameters. Exemplary video recording parameters include a frame rate, exposure percentage, exposure duration, time-stamp, frame size including frame width, height and position, number of frames, sensor gain, sensor impulse or frequency response, lens aperture size, lens focal length, lens distortion parameters, actual and effective sensor pixel sizes, optical sensor center position and the like.

In an embodiment, the data sets of sensor information may first be processed using conventional processing means. For example, processing may include extraction of data from the data sets of sensor information, including extraction of displacement data and other information. Such data may be extracted on a pixel by pixel basis as would be known in the art. Processing may be performed "on the fly" as the data sets of sensor information are captured, or the data sets of sensor information may be stored for later processing. The plurality of processed data sets of sensor information may then be averaged to provide an averaged synchronized data set.

Processing may include analyzing the data sets for movement, vibration, and other issues. This analysis may be performed using conventional means. The analysis may include calculating a motion of the object 101. In some embodiments, the motion may be an unexpected or undesired motion, for example, due to a defect, abnormality, or other issue. In some embodiments, the motion may be a displacement and displacement data for the averaged synchronized data set may be calculated. In an embodiment, such displacement data may be analyzed on a pixel by pixel basis as would be known in the art. The analysis may also include graphing, for example graphing the calculated displacement data or other information.

The analysis may also include the creation/generation of video representations showing the detected motion. Altered, enhanced, modified, and/or magnified videos may also be used, either as part of the initial creation/generation or by further processing. For example, displacement and/or motion may be increased, scaled, magnified, amplified, or otherwise changed so that the displacement and/or motion is more noticeable.

As discussed above, data sets collected by a sensor such as the at least one sensory system 111 may contain significant measurement errors. In particular, measurement errors may be introduced due to exposure durations. As discussed above, because video is being used, it is often desirable to collect data sets using long exposure durations, for example, in order to collect as much light as possible and ensure a high quality picture. However, long exposure durations also distort the sampled signals within the video. This distortion is especially problematic as the duration of observed motion approaches the imaging exposure duration.

When a signal is acquired representing motion that occurs over a much longer time frame than that of the exposure, the true value of the signal is closely represented. For example, almost no distortion is present and the maximum sampled signal may represent close to 100% of the true maximum value, i.e., approximately 98% in some cases.

However, when a signal is acquired representing motion which occurs over a time frame approaching that of the exposure, the sampled signal may become highly distorted. For example, the maximum sampled signal may represent a substantial deviation from the true value, for example, approximately 70% in some cases.

Embodiments of the invention may include methods for correcting for such measurement errors, including methods for correcting for measurement errors due to exposure.

For example, a method according to an embodiment of the invention may comprise the following steps: providing a processor and at least one video sensor; determining video recording parameters of the at least one video sensor; recording, by the at least one video sensor, video of the object; extracting a data set from the video wherein the data set describes the motion of the object; calculating a frequency transform of the data set for at least one frequency; and performing exposure correction at the at least one frequency based on the recording parameters. In embodiments, the method may also include calculating a frequency spectrum of the data set and/or calculating a FFT for the frequency spectrum. Further embodiments may include selecting a frequency of interest and/or receiving a selection of the frequency of interest from the frequency spectrum as the at least one frequency. In embodiments, pixel intensity may be averaged. Still further, embodiments of the method may include applying a compensation function.

Exposure correction is discussed in more detail below, and may include the use of a compensation function and/or the calculation of a sensitivity function (and/or reciprocal). In additional embodiments, the method may include calibrating the at least one video sensor; and determining a calibration function; wherein performing exposure correction includes applying the calibration function. Calibrating may include recording a video of a test object with a known motion magnitude and frequency.

As another example, a method according to an embodiment of the invention may include the following steps: providing a video and recording parameters of the video; extracting a data set from the video, wherein the data set includes a time series signal; calculating a frequency transform of the time series signal for at least one frequency; and performing exposure correction at the at least one frequency using the recording parameters. Further embodiments may include calculating a frequency spectrum of the data set. As discussed above, exposure correction may include calculation of a sensitivity function and its reciprocal.

A method according to alternative or addition embodiments may include: determining video recording parameters, producing a video recording of an event, extracting a data set from the recording as a time series digital signal describing the event, calculating a frequency spectrum of the time series signal, selecting a frequency of interest, for example, wherein the frequency of interest corresponds to an event frequency, and determining the frequency spectrum amplitude value at the frequency of interest. As an example, the time series signal may be the pixel intensity values at a given position on the video. Alternatively, the time series signal may be a combination of pixel intensity values, such as an averaged intensity. The pixel intensity in each video frame is the integral value of the light intensity collected by the video camera during the video acquisition.

Potential measurement errors will now be discussed in more detail with respect to an embodiment of the invention. In an embodiment, the collected data sets or video recordings may comprise separate image frames that are recorded at a specific repetition rate, i.e. the frame rate. Each image frame in the video is acquired for a set time interval, referred to as the exposure duration. By definition, the exposure duration cannot be larger than the inverse of the frame rate and thus can be measured as a percentage of the inverse frame rate, 100% exposure being the maximum possible exposure duration. Often, better videos are obtained when the maximum exposure duration is used, because using the maximum exposure duration maximizes the amount of detected light and the resulting signal to noise ratio.

Time-varying signals are effectively averaged within the exposure time interval. As discussed above, this tends to improve the resulting video and signal quality, but leads to signal distortions and measurement errors as the duration of observed motion approaches the imaging exposure duration. For example, the signal frequency spectrum is distorted such that the detected amplitudes decrease at higher frequencies within the sampled frequency range. Again, this problem becomes evident when dealing with signals collected using long exposure durations.

The signal decrease and corresponding signal compensation may be described by a sensitivity function and its reciprocal, respectively:

$$\omega = \frac{\text{Frequency}_{Hz} \times \pi_{radians} \times \text{Exposure Percentage}_{0\ to\ 1}}{\text{Frame Rate}_{fps}}$$

$$\text{Sensitivity} = \frac{\sin(\omega)}{\omega}$$

$$\text{Compensation} = \text{Reciprocal of Sensitivity} = \frac{\omega}{\sin(\omega)}$$

Figure 2:
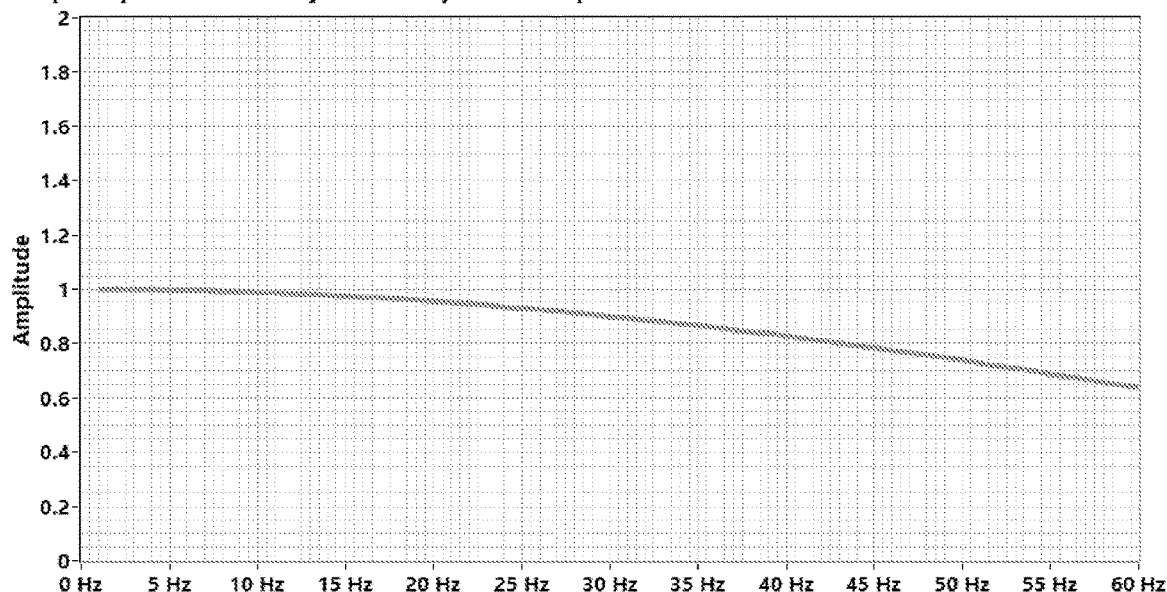
FIG. 2 depicts a graph showing a representative exposure sensitivity.

An example of exposure sensitivity according to an embodiment is shown in FIG. 2, in which a resulting decrease in amplitude at increasing frequencies is plotted. As shown, as the duration of motion decreases, and thus the frequency of the motion increases, the detected amplitude decreases. Further, as discussed above, the sampled amplitude may be only approximately 70% of the true amplitude value in some embodiments.

FIG. 2 uses a representative frame rate of 120 fps and 100% exposure duration. As will be clear from the sensitivity function described above, distortion of the detected amplitude will vary based on the frame rate; however, any desired frame rate may be plotted as shown in FIG. 2.

Embodiments of the invention provide an approach to correct this measurement error/distortion by evaluating three independent variables: the frame rate, exposure duration, and frequency of interest. This allows for generation of a compensation function for any frequency of interest as a reciprocal of the sensitivity. In embodiments, this compensation function can be applied to the data during or after the step of calculating the frequency spectrum of the time series signal, during or after the step of selecting a frequency of interest, and determining the frequency spectrum amplitude value at the frequency of interest, or at other points.

Figure 3:
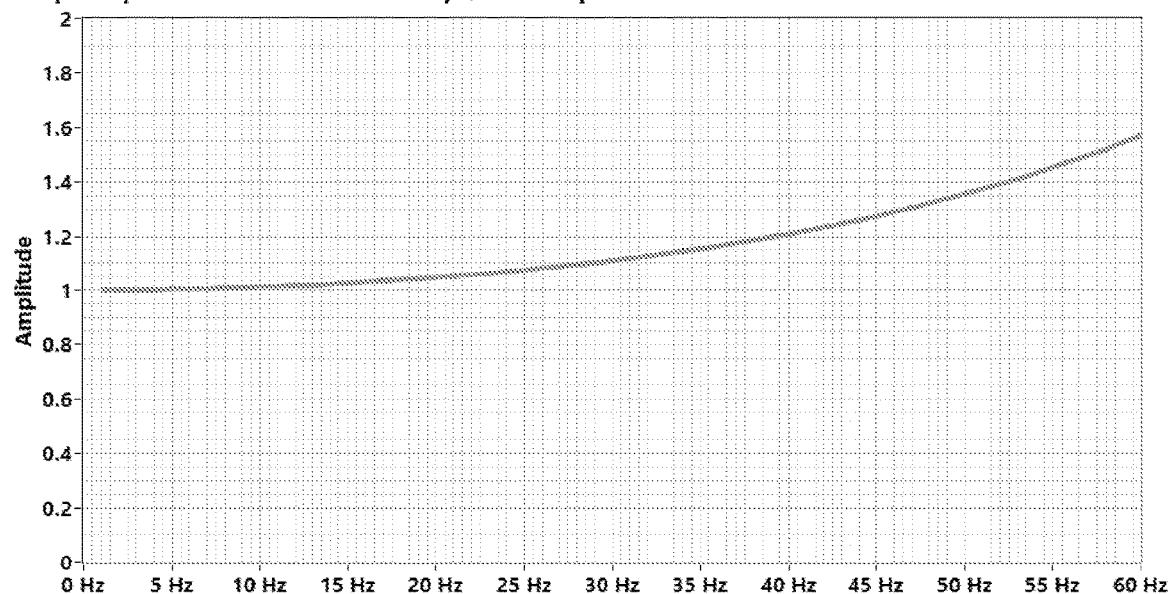
FIG. 3 depicts a graph showing a representative exposure compensation.

For example, embodiments of the method may compensate for the perceived decrease in amplitude based on the variables discussed above. FIG. 3 plots representative compensation functions at respective frequencies to correct for the detected decrease in amplitude shown in FIG. 2. Again, FIG. 3 uses the representative frame rate of 120 fps and 100% exposure duration.

As discussed in more detail below, in some embodiments additional error correction may also be used instead of, or in addition to, this compensation function.

Figure 4:
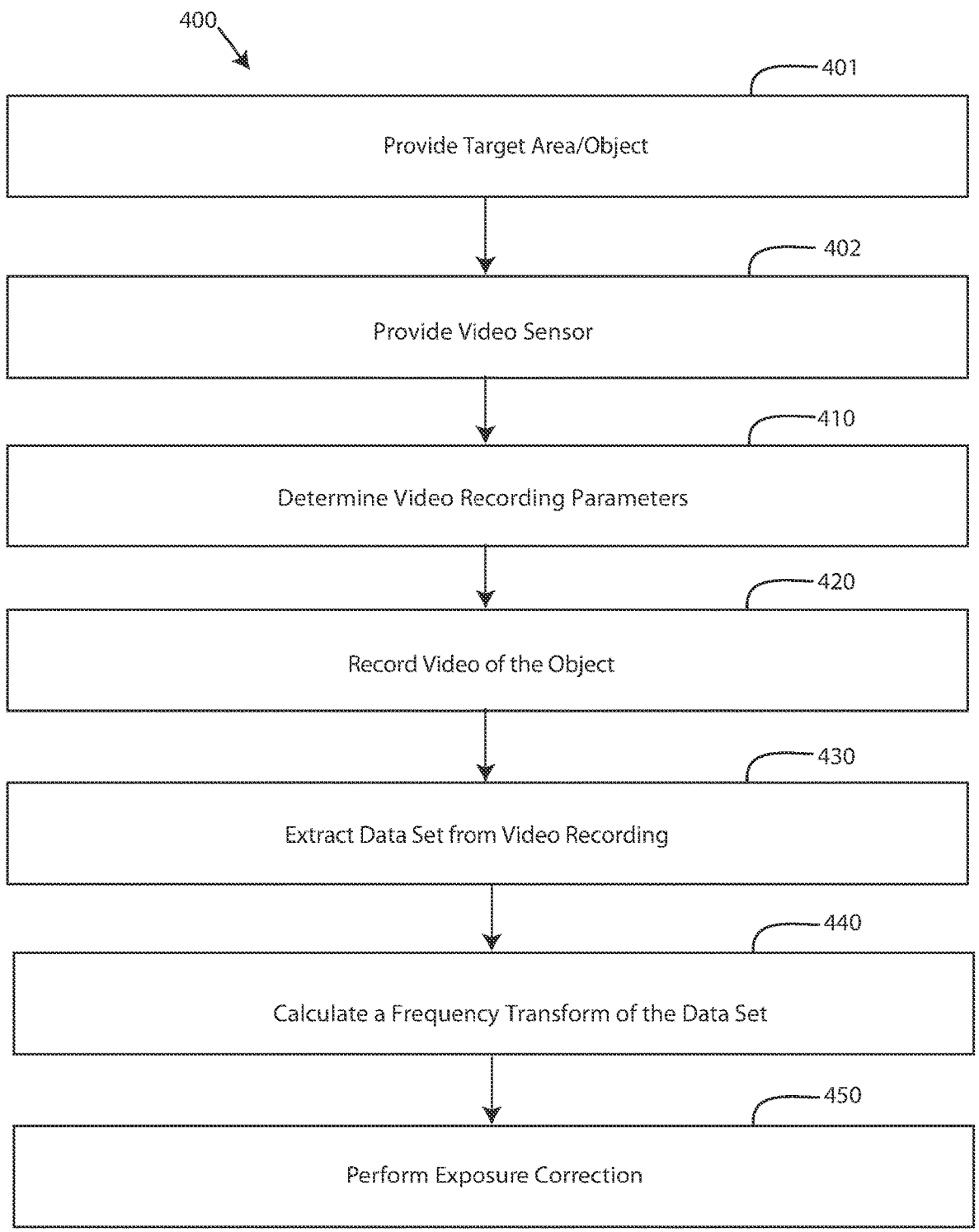
FIG. 4 depicts a flow chart of a method for motion detection, quantification, and/or measurement with exposure correction in accordance with embodiments of the present invention.

Referring now to FIG. 4, a flow chart of a method 400 for motion detection, quantification, and/or measurement with exposure correction, in accordance with embodiments of the present invention is depicted. Embodiments of the method 400 may begin with optional step 401, wherein the target area or object is provided and/or optional step 402, wherein a video sensor or a video sensor system comprising a camera system, such as the video sensor 111 of the sensor system 110, is provided. Optional step 402 may also include providing a processor, such as processor 112. In alternative embodiments, steps 401 and 402 may not be required, and method 400 may begin with step 410.

In step 410, video recording parameters are determined. For example, frame rate and exposure percentage parameters may be set or identified. Other parameters may be used as discussed above.

In step 420, a video recording of at least one of an event or object may be produced, captured, or generated. The video recording may be produced, captured, or generated using the determined video recording parameters.

In step 430, a data set is extracted from the video recording. The data set may describe the motion of the object. The data set may comprise a time series digital signal, for example, a time series digital signal describing the event or a feature of the object. As discussed above, the time series signal may be pixel intensity values at a given position or a combination thereof.

In step 440, a frequency transform of the data set is calculated.

In step 450, exposure correction may be performed based on the recording parameters. In embodiments, exposure correction may include applying a compensation function, and also calculating/using a sensitivity function (and/or its reciprocal).

In some embodiments, the method may also include the step of calculating a frequency spectrum. Still further, the method may include selecting and/or receiving a frequency of interest as the at least one frequency. For example, the frequency of interest may correspond to an event frequency or more correspond to a periodic part of the motion of the object. In an embodiment, selection of the frequency of interest may include receiving a selection of a frequency of interest, for example, from a user. Alternatively, selection may be performed based on the data set, based on predefined information, or other factors. A FFT for the frequency spectrum may also be calculated. While not shown, in some embodiments the method 400 may conclude with a determination of a respective motion of the object or associated with the object. The determined motion may be more accurate due to the exposure correction discussed herein.

Further, in some embodiments, calculating the frequency spectrum may be performed for the data set, frequency spectrum amplitudes may be determined for the data set, and exposure correction may be performed with respect to the determined frequency spectrum amplitudes of the data set. Thus, correction may be applied to all frequencies in addition to, or as an alternative to, the frequency of interest.

In some embodiments, captured video data distortion may not precisely follow an expected plot such as that shown in FIG. 2. Deviation from the expected distortion may be due to, for example, calibration issues with the video recording apparatus, an irregular acquisition window, artifacts in the video recording apparatus, and the like.

Thus, in some embodiments, a fit function may be developed based on the observed deviation for the specific video recording apparatus. For example, an arbitrary calibration function may also be used to offset observed deviations from the expected decrease in amplitude. In additional embodiments, the deviation may be compensated for in other ways, such as by using an offset or other value, function, or factor.

Referring to videos more generally, videos generally are viewed as collections of separate still images that when shown in sequence create an impression of moving pictures. However, in some cases videos can be instead more appropriately described as a collection of pixel recordings, where each pixel contains a time-varying signal—the pixel intensity proportional to the amount of light collected by the sensor in a single frame. The videos are usually recorded at a specific repetition rate, i.e. the frame rate. Each image frame in the video is acquired for a set time interval, which is called the exposure time or duration. By definition, the exposure time/duration cannot be larger than the inverse of the frame rate and thus can be measured as a fraction of the inverse frame rate, 100% exposure being the maximum exposure.

Typically, better videos are obtained when the maximum exposure is used, because it maximizes the amount of detected light and the resulting signal to noise ratio. As a result, time-varying signals carried by each pixel are effectively averaged within the exposure time interval. This leads to signal distortions at high frequencies, which can be similar to the effects of a low-pass filter. For example, this effect can be readily observed in the Fourier Transform (FFT) spectrum of such a signal. The exact shape of the signal distortion depends on the sensor filtering characteristics. This function is an FFT of a sensor's response function. For example, if the sensor (a pixel in this case) has a rectangular response function, i.e. it remains fully open and collects light only for a fixed exposure time interval, the signal distortion can be described by the sinc(x) function $(\sin(x)/x)$, where $x=\pi\omega t/f$. ($\omega$ is the signal frequency, t is the exposure in percent and f is the frame rate). This example shows that when the maximum exposure is used, signal distortion levels can reach 36%.

In general, however, sensors used in video acquisition may have other kinds of response functions, different from the ideal rectangular window. Possible examples include trapezoidal, triangular, Gaussian, and other types of windows. In these cases, the resulting signal distortions will have different spectral shapes in the frequency domain (other than the sinc(x) function). When the sensor response is known and well characterized, the corresponding signal distortion in the frequency domain can be readily calculated using the frequency processing technique, such as FFT or wavelets.

However, it often may be difficult or impossible to characterize the sensor's response function. In this case the signal distortion spectrum can be determined empirically by conducting a series of test measurements, in which the same test signal is recorded at different exposure settings while keeping all other parameters constant. For example, test videos may include images of a moving target having a periodic motion at a fixed frequency F with a peak-to-peak displacement of about 1 mil (or more generally in 0.01-100 mils range). In general, a wide range of frame rates may be used for these videos (above and below 2F), but for most purposes it may be selected to be close to 2F. Several videos of the same target may be recorded at different exposure settings ranging from nearly 0% to nearly 100%. In the absence of signal distortions the measured displacement magnitudes obtained from these videos would be the same. However, in practice these magnitudes are not the same and their dependence on the exposure follows the characteristic distortion function specific to the video sensor used in these measurements. Using this test data, the characteristic distortion function can be measured for a given sensor and then applied as necessary to compensate for signal distortions.

In an embodiment, a method for determining the signal distortion function may include the following steps: (1) setting up a vibrating target at a fixed frequency and a fixed amplitude, (2) acquiring a set of videos of the target at a fixed frame rate wherein each video is characterized by a relative exposure (ratio of an exposure time to the inverse of the frame rate), (3) analyzing each video and measuring the resulting vibration amplitudes and (4) determining the signal distortion function by plotting the relative signal amplitude vs. the relative exposure.

Figure 5:
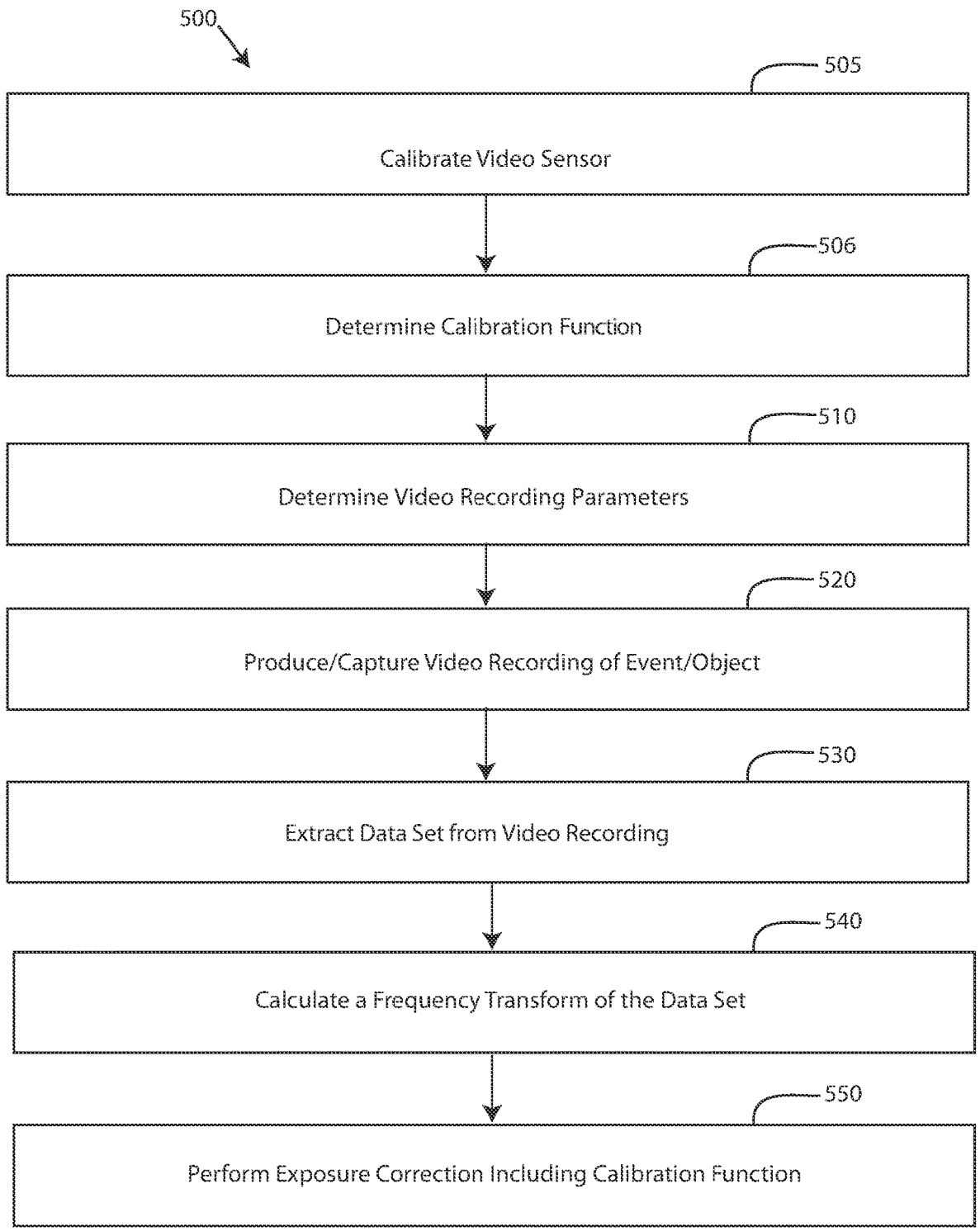
FIG. 5 depicts a flow chart of a method for motion detection, quantification, and/or measurement with exposure correction in accordance with additional embodiments of the present invention.

Referring now to FIG. 5, a flow chart of a method 500 for motion detection, quantification, and/or measurement with exposure correction, in accordance with embodiments of the present invention is depicted. Embodiments of the method 500 may begin with optional steps, such as optional step 401 discussed above in method 400 wherein the target area/object is provided and/or optional step 402 discussed above in method 400 wherein a video sensor or a video sensor system comprising a camera system, such as the video sensor 111 of the sensor system 110, is provided. However, these steps are not shown in FIG. 500 for the sake of clarity.

Instead, method 500 includes an initial step 505 wherein the video sensor is calibrated, for example, by recording a set of test data. In some embodiments, the test data may be compared with known information, for example, a known signal may be sampled in the test data and the sampled signal may be compared with the known signal. Calibration may include recording a test video, for example, of a test object with known motions or characteristics. A response function of output-divided-by-input for the sensor at the at least one frequency may also be calculated. The response function at a given frequency may be calculated for example, by providing a vibration target at the given frequency with a calibrated or otherwise pre-determined displacement amplitude, measuring the observed response in the test video, and calculating the ratio between the measured vibration amplitude (output) and the calibrated amplitude (input).

In step 506, a calibration function may be determined. As discussed above, the calibration function may account for any deviation of the captured video data from an expected plot of amplitude decrease. In the embodiment discussed above, the calibration function may account for deviation between the known signal and the sampled signal. Further, in some embodiments, the calibration function may account for deviation between the known signal and an expected sampled signal. For example, the expected sampled signal may be an expected sampled signal based on the error/exposure correction discussed above, i.e., based on the discussed sensitivity function and/or based on an error compensation plot such as that of FIG. 3. In some embodiments, the calibration function may be a fit function, an offset, or other value, function, or factor.

In embodiments, the calibration and/or the determination of the calibration function may use the method for determining the signal distortion function discussed above. For example, these steps may include all or some of the steps of: (1) setting up a vibrating target at a fixed frequency and a fixed amplitude, (2) acquiring a set of videos of the target at a fixed frame rate wherein each video is characterized by a relative exposure (ratio of an exposure time to the inverse of the frame rate), (3) analyzing each video and measuring the resulting vibration amplitudes and (4) determining the signal distortion function by plotting the relative signal amplitude vs. the relative exposure.

Steps 510 through 550 generally correspond to steps 410 through 450 discussed above in method 400.

In step 510, video recording parameters are determined. For example, frame rate and exposure percentage parameters may be set or identified.

In step 520, a video recording of at least one of an event or object may be produced, captured, or generated. The video recording may be produced, captured, or generated using the determined video recording parameters.

In step 530, a data set is extracted from the video recording. The data set may describe the motion of the object. The data set may comprise a time series digital signal, for example, a time series digital signal describing the event or a feature of the object. As discussed above, the time series signal may be pixel intensity values at a given position or a combination thereof.

In step 540, a frequency transform of the data set is calculated.

In step 550, exposure correction may be performed based on the recording parameters. Exposure correction may include application of the calibration function. Still further, exposure correction may include applying a compensation function and/or calculation of a sensitivity function (and/or its reciprocal). Again, while not shown, in some embodiments the method 500 may conclude with a determination of a respective motion of the object or associated with the object. The determined motion may be more accurate due to the exposure correction discussed herein.

It will be understood that specific details of method 400 may be applied to method 500 and vice versa. Further, it will be understood that, in some embodiments, method steps may be performed out of order, method steps may be omitted, and/or additional method steps may be included.

Further, either or both of methods 400 and 500 may include creating or outputting a video representing extracted data, for example, the determined motion of the object or associated with the object. For example, the created or outputted video may depict motion, displacement, vibration, and the like. Further, in some embodiments, additional processing or editing may be performed on the video. For example, the analyzed motion may be magnified, amplified, or otherwise altered to more clearly show the detected/calculated motion/vibration. For example, movement may be increased, scaled, magnified, amplified, exaggerated, or otherwise changed so that the movement is more noticeable. This may be performed during the creation of the video representation, or may be performed separately, i.e., after creation of the video.

The motion detection, quantification, and/or measurement and error correction methods described herein may improve data accuracy. For example, when maximum exposure duration is used, the compensation described herein may improve data accuracy by as much as 36%. Further, resulting data may approximate results that would be achieved were there no deviation due to exposure durations. For example, maximum sampled signal may represent close to 100% of the true signal value, i.e., approximately 98%. Thus, signals may be collected using video with any exposure duration settings resulting in high quality video capture and accurate signal detection.

For example, a machine may experience high frequency vibrations with magnitudes or velocities exceeding acceptance criteria. However, when such vibrations are measured with a video apparatus without taking into account the exposure corrections described above, their magnitudes and velocities may be undervalued and as a result, this problem may not be identified and flagged in the appropriate time.

The motion detection, quantification, and/or measurement and error correction methods may be used to make changes to the object 101. For example, settings, conditions, parameters, and the like may be changed based on the motion detection and error correction. In embodiments where the object 101 is a machine, the machine may be controlled or operated based on the motion detection and error correction and/or based on the sampled signal. For example, the machine may be operated so as to reduce or eliminate vibrations or to ensure vibrations remain within acceptable thresholds.

Figure 6:
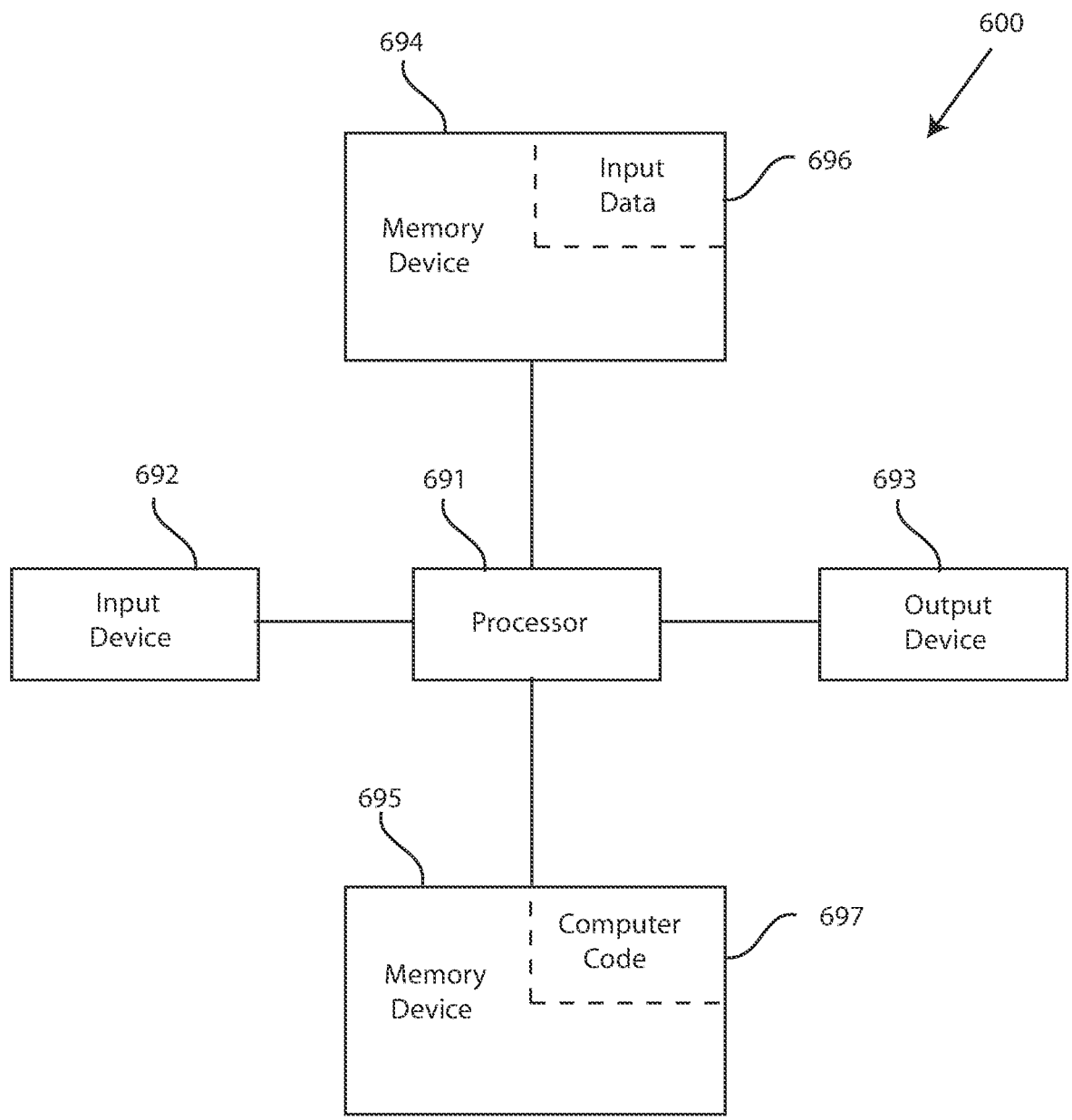
FIG. 6 depicts a block diagram of a computer system for a motion detection, quantification, and/or measurement of FIG. 1, capable of implementing a method for detection, quantification, and analysis of motion FIGS. 4 and 5 in accordance with embodiments of the present invention.

FIG. 6 depicts a block diagram of a computer system for the motion detection system with exposure correction 100 of FIG. 1, capable of implementing methods for motion detection with exposure correction of FIGS. 2-3 in accordance with embodiments of the present invention. The computer system 600 may generally comprise a processor 691, an input device 692 coupled to the processor 691, an output device 693 coupled to the processor 691, and memory devices 694 and 695 each coupled to the processor 691. The input device 692, output device 693 and memory devices 694, 695 may each be coupled to the processor 691 via a bus. Processor 691 may perform computations and control the functions of computer system 500, including executing instructions included in the computer code 697 for the tools and programs capable of implementing a method for motion detection and exposure correction in the manner prescribed by the embodiments of FIGS. 2-3 using the motion detection system with exposure correction 100 of FIG. 1, wherein the instructions of the computer code 697 may be executed by processor 691 via memory device 695. The computer code 697 may include software or program instructions that may implement one or more algorithms for implementing the method for motion detection with exposure correction, as described in detail above. The processor 691 executes the computer code 697. Processor 691 may include a single processing unit, or may be distributed across one or more processing units in one or more locations (e.g., on a client and server).

The memory device 694 may include input data 696. The input data 696 includes any inputs required by the computer code 697. The output device 693 displays output from the computer code 697. Either or both memory devices 694 and 695 may be used as a computer usable storage medium (or program storage device) having a computer-readable program embodied therein and/or having other data stored therein, wherein the computer-readable program comprises the computer code6. Generally, a computer program product (or, alternatively, an article of manufacture) of the computer system 600 may comprise said computer usable storage medium (or said program storage device).

Memory devices 694, 695 include any known computer-readable storage medium, including those described in detail below. In one embodiment, cache memory elements of memory devices 694, 695 may provide temporary storage of at least some program code (e.g., computer code 697) in order to reduce the number of times code must be retrieved from bulk storage while instructions of the computer code 697 are executed. Moreover, similar to processor 691, memory devices 694, 695 may reside at a single physical location, including one or more types of data storage, or be distributed across a plurality of physical systems in various forms. Further, memory devices 694, 695 can include data distributed across, for example, a local area network (LAN) or a wide area network (WAN). Further, memory devices 694, 695 may include an operating system (not shown) and may include other systems not shown in FIG. 6.

In some embodiments, the computer system 600 may further be coupled to an Input/output (I/O) interface and a computer data storage unit. An I/O interface may include any system for exchanging information to or from an input device 692 or output device 693. The input device 692 may be, inter alia, a keyboard, a mouse, etc. or in some embodiments the touchscreen of a computing device. The output device 693 may be, inter alia, a printer, a plotter, a display device (such as a computer screen), a magnetic tape, a removable hard disk, a floppy disk, etc. The memory devices 694 and 695 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 600, and may include any type of transmission link, including electrical, optical, wireless, etc.

An I/O interface may allow computer system 600 to store information (e.g., data or program instructions such as program code 697) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to detection and analysis of motion. Thus, an embodiment of the present invention discloses a process for supporting computer infrastructure, where the process includes providing at least one support service for at least one of integrating, hosting, maintaining and deploying computer-readable code (e.g., program code 697) in a computer system (e.g., computer system 500) including one or more processor(s) 691, wherein the processor(s) carry out instructions contained in the computer code 697 for detection and analysis of motion. Another embodiment discloses a process for supporting computer infrastructure, where the process includes integrating computer-readable program code into a computer system 600 including a processor.

The step of integrating includes storing the program code in a computer-readable storage device of the computer system 600 through use of the processor. The program code, upon being executed by the processor, implements a method for detection and analysis of motion. Thus, the present invention discloses a process for supporting, deploying and/or integrating computer infrastructure, integrating, hosting, maintaining, and deploying computer-readable code into the computer system 600, wherein the code in combination with the computer system 500 is capable of performing a method for detection and analysis of motion.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, C#, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
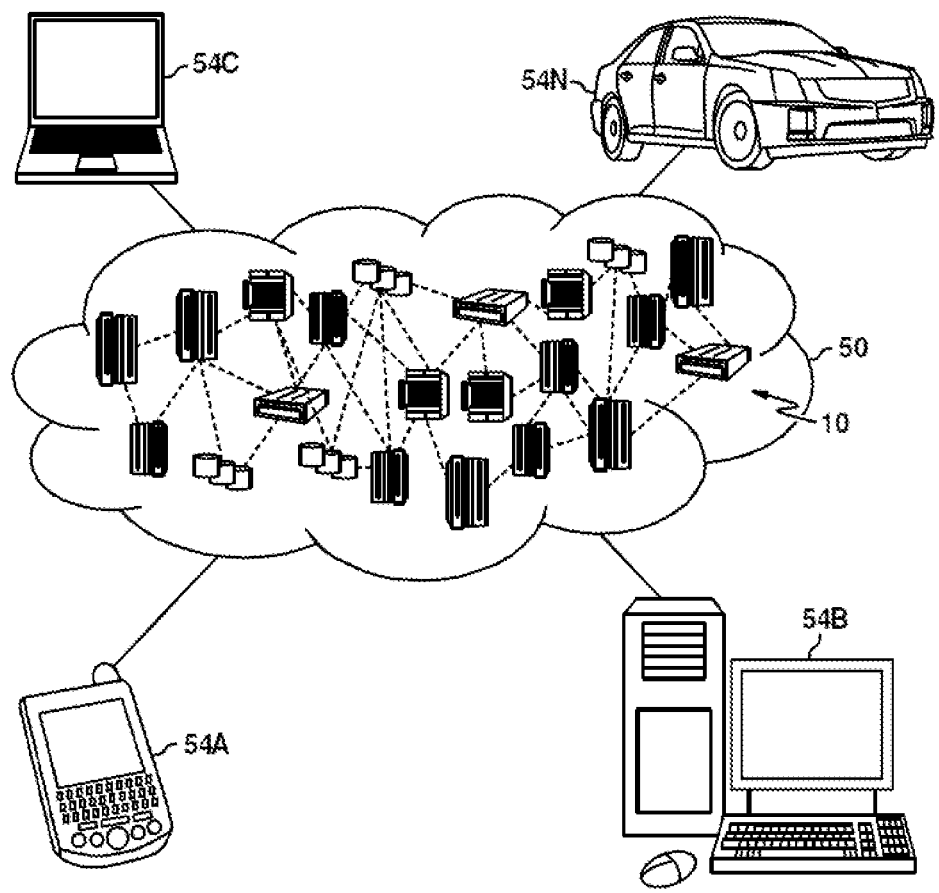
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
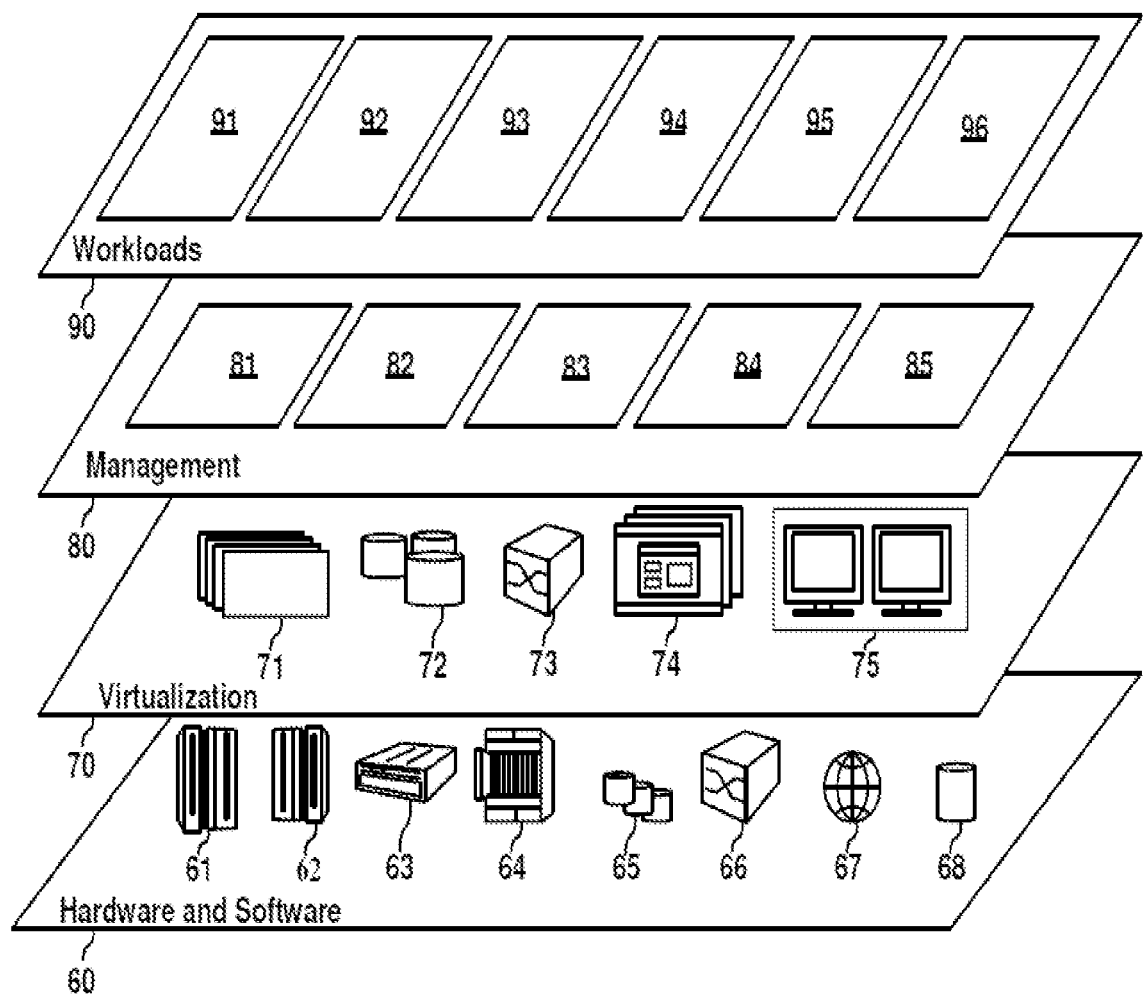
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 25 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for detection of motion with exposure correction 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for detecting motion of an object and correcting for exposure, comprising:
   providing a processor and at least one video sensor;
   determining video recording parameters of the at least one video sensor;
   recording, by the at least one video sensor, video of the object;
   extracting a data set from the video, wherein the data set describes the motion of the object and includes a measurement error;
   calculating a frequency transform of the data set for at least one frequency;
   performing exposure correction at the at least one frequency based on the recording parameters; and
   determining a corrected motion of the object based on the exposure correction;
   wherein the motion of the object has a periodic part and the at least one frequency corresponds to a frequency of the periodic part of the motion of the object.

2. The method of claim 1, further comprising: calculating a frequency spectrum of the data set.

3. The method of claim 2, further comprising: selecting a frequency of interest and/or receiving a selection of the frequency of interest from the frequency spectrum as the at least one frequency.

4. The method of claim 1, wherein the data set is a time series digital signal.

5. The method of claim 1, wherein the data set comprises at least one pixel intensity.

6. The method of claim 5, further comprising averaging the at least one pixel intensity.

7. The method of claim 1, wherein exposure correction includes applying a compensation function.

8. The method of claim 1, wherein exposure correction comprises calculation of a sensitivity function and its reciprocal.

9. The method of claim 1, wherein the frequency transform is a Fourier transform.

10. The method of claim 2, further comprising calculating a FFT for the frequency spectrum of the data set.

11. The method of claim 1, further comprising:
    calibrating the at least one video sensor; and
    determining a calibration function;
    wherein performing exposure correction includes applying the calibration function.

12. The method of claim 11, wherein calibrating the sensor comprises recording a video of a test object with a known motion magnitude and frequency.

13. The method of claim 11, further comprising calculating a response function of output-divided-by-input for the sensor at the at least one frequency.

14. The method of claim 1, wherein an event takes place with respect to the object and the at least one frequency corresponds to an event frequency.

15. The method of claim 1, wherein the data set describes the motion of the object in the plane perpendicular to the line-of-sight of the video sensor.

16. A method of detecting motion, comprising:
    providing a video and recording parameters of the video;
    extracting a data set from the video, wherein the data set includes a time series signal describing an event, wherein the event is a motion of an object and wherein the data set includes a measurement error with respect to the motion of the object;
    calculating a frequency spectrum of the data set;

selecting a frequency of interest and/or receiving a selection of the frequency of interest from the frequency spectrum;

calculating a frequency transform of the time series signal for the frequency of interest;

performing exposure correction at the frequency of interest using the recording parameters; and determining an actual motion of the object based on the exposure correction.

17. The method of claim 16, wherein the motion of the object has a periodic part and the frequency of interest corresponds to a frequency of the periodic part of the motion of the object.

18. The method of claim 16, wherein exposure correction comprises calculation of a sensitivity function and its reciprocal.

19. A computer program product, comprising a computer readable hardware storage device storing a computer readable program code, the computer readable program code comprising an algorithm that when executed by a computer processor of a computing system implements a method for detecting motion with respect to an object and correcting for exposure, the method comprising:

extracting a data set from a video, wherein the data set includes a time series signal describing an event, wherein the event is a motion of an object and wherein the data set includes a measurement error with respect to the motion of the object;

calculating a frequency spectrum of the data set;

selecting a frequency of interest and/or receiving a selection of the frequency of interest from the frequency spectrum;

calculating a frequency transform of the time series signal for the frequency of interest;

performing exposure correction at the frequency of interest using recording parameters of the video; and determining an actual motion of the object based on the exposure correction.

\* \* \* \* \*